United States Patent [19]
Rutledge et al.

[11] Patent Number: 5,764,219
[45] Date of Patent: Jun. 9, 1998

[54] CONTROLLER FOR IMPROVED COMPUTER POINTING DEVICES

[75] Inventors: Joseph D. Rutledge, Mahopac; Edwin J. Selker, New York, both of N.Y.

[73] Assignee: IBM Corporation, Armonk, N.Y.

[21] Appl. No.: 572,194

[22] Filed: Dec. 14, 1995

Related U.S. Application Data

[63] Continuation of Ser. No. 217,217, Mar. 24, 1994, abandoned, which is a continuation of Ser. No. 917,091, filed as PCT/US90/06830, Nov. 29, 1990, abandoned.

[51] Int. Cl.$^6$ ........................................... G09G 5/08
[52] U.S. Cl. .................................. 345/159; 345/145
[58] Field of Search ............................. 345/159, 145, 345/157, 163, 161, 167

[56] References Cited

U.S. PATENT DOCUMENTS

| | | | |
|---|---|---|---|
| 4,313,113 | 1/1982 | Thornburg | 345/159 |
| 4,386,346 | 5/1983 | Levine | 345/159 |
| 4,493,992 | 1/1985 | Geller | 340/709 |
| 4,500,876 | 2/1985 | English et al. | 340/709 |
| 4,563,740 | 1/1986 | Blake et al. | 340/709 |
| 4,578,674 | 3/1986 | Baker et al. | 340/710 |
| 4,698,626 | 10/1987 | Sato et al. | 340/710 |
| 4,734,685 | 3/1988 | Watanabe | 340/710 |
| 4,736,191 | 4/1988 | Matzke et al. | 340/367 |
| 4,787,051 | 11/1988 | Olson | 364/518 |
| 4,868,549 | 9/1989 | Affinito et al. | 340/710 |
| 4,891,632 | 1/1990 | Chang | 340/710 |
| 4,912,672 | 3/1990 | Giorgio | 364/900 |
| 4,931,781 | 6/1990 | Miyakawa | 340/706 |
| 4,935,728 | 6/1990 | Kley | 340/709 |
| 4,983,786 | 1/1991 | Stevens et al. | 345/159 |
| 5,565,887 | 10/1996 | McCambridge et al. | 345/145 |
| 5,570,111 | 10/1996 | Barrett et al. | 345/145 |

FOREIGN PATENT DOCUMENTS

| | | | |
|---|---|---|---|
| 56-163411 | 12/1981 | Japan | 340/709 |
| 1179193 | 7/1989 | Japan | 340/709 |

OTHER PUBLICATIONS

"Increasing Spatial Method for Accelerating Keystroke Action" IBM Technical Disclosure Bulletin vol. 26, No. 2, Jul. 1983.
Human–Computer Interaction Interact '90, Third Int'l Conference, Cambridge, U.K. 27–31, Aug. 1990.
Ergonomics, vol. 21, No. 8, pp. 601–613 (1978).
Powermice and User Performance, ACM CHI '90.
IBM Mouse Technical Reference, First Edition (Apr. 1987).
S. K. Card et al. *Ergonomics*, vol. 21, pp. 601–613, (1978).
"Tasagraph" Digital X–Y Controller data sheet, Touch Activated Switch Arrays, Inc. Santa Clara, CA (21 Jul. 1982).
*IBM Mouse Technical Reference manual* 1st ed. International Business Machines Corporation, Armonk, New York (Apr. 1987).
Hawley X063X Mouse data sheet, Hawley Laboratories, Berkeley, CA.
A. Chandra and J.D. Rutledge, Computer Science Principles progress reports, IBM T.J. Watson Research Center, Yorktown Heights, NY, FourthQuarter 1987 (pp. 5–6), First Quarter 1988 (pp. 4–5), Third Quarter 1988 (p. 7), and Fourth Quarter 1988 (p. 8).
*Microsoft Mouse User's Guide* Version 7, Microsoft Corporation, (1989).
H. D. Jellinek et al. *ACM CHI '90* pp. 213–219.
J.D. Rutledge and E.J. Selker in *Human–Computer Interaction Interact '90*, Proceedings of the Third International Conference, Cambridge, UK, 27–31 Aug. 1990, D. Diaper et al., eds.

*Primary Examiner*—Richard Hjerpe
*Assistant Examiner*—Amare Mengista
*Attorney, Agent, or Firm*—Sughrue, Mion, Zinn, Macpeak & Seas, PLLC

[57] ABSTRACT

Input force applied on a pointing device (51) having outputs (x,y) is related to the velocity of a cursor on a video screen according to a transfer function (FIG. 2) substantially described by a parabolic sigmoid function, thus resulting in adapting the force/velocity relationship to accommodate human perception and motor control limitations and task specific coordination problems.

29 Claims, 3 Drawing Sheets

CONTROLLER FOR IMPROVED COMPUTER POINTING DEVICES

This is a Continuation of application Ser. No. 08/217,217 which was filed on Mar. 24, 1994, now abandoned, which is a Continuation application of application Ser. No. 07/917,091, which was filed as PCT/US90/06830, Nov. 29, 1990, now abandoned.

FIELD OF THE INVENTION

The present invention relates to a controller for relating the force applied to a user-controlled pointing device, for example, a joystick, to the velocity of a cursor on a video screen.

BACKGROUND OF THE INVENTION

A wide variety of devices have been proposed and used to implement operator control of a cursor on a video display screen. These can be classified as discrete (such as keystroke) and continuous (analog) controls, and within analog, according to the mapping between the input quantity (position, force, etc.) and the cursor position, velocity, acceleration, etc.. A number of comparative studies have generally found that best results are obtained with a more or less linear mapping from position to position, as exemplified by a "mouse". However, the mouse requires significant desk space, and requires that the operator remove his (her) hand from the keyboard for each mouse operation, while a force to velocity mapping permits the control to occupy negligible space, and thus to be placed close to or within the normal keyboard.

The force joystick has a long history of investigation and use. It has been found that pointing times could be expected to be perhaps 20% slower than for a mouse performing the same tasks. Another concern is the "feel"—the subjective impression of exact control of the cursor, and that its movements are the "natural" response to actions.

Many people find pointing with the position of a mouse natural. The rate joystick appears to have an immediate disadvantage here, since the most natural response to a hand motion (for many people) is a movement of proportional magnitude, independent of duration. An analogous discordance will be recalled by anyone who has taken the controls of a light aircraft for the first time—the aircraft responds to a control offset with a rate of change, not with a direct change.

Conventional force to velocity mappings have involved transfer functions in which the cursor velocity always increases as the input force increases. Cursor controllers using these mappings are generally perceived to be frustrating to use, since when the joystick is displaced to its maximum extent, the cursor tends to move across the screen at a speed which is faster than the eye can follow. Consequently, users attempting to position the cursor on a target point on the display screen tend to overshoot the target point. As a result, users must make additional displacements of the joystick to recover from the overshoot.

SUMMARY OF THE INVENTION

An object of the present invention is to provide a controller for a video pointing device, such a controller providing a mapping between the force applied on the pointing device and the resulting velocity of a cursor on the video screen, and such a mapping solving the above-mentioned problems with respect to conventional force to velocity mappings.

Specifically, it is an object of the invention to take advantage of the space-saving features of force-to-velocity mappings (as opposed to position-to-position mappings such as a mouse) in such a way that user frustration is reduced by using a force-to-velocity mapping which does not exceed human perception and motor control.

The above objects have been attained by using a force-to-velocity mapping in which certain areas of the mapping transfer function are caused to assume certain forms, such forms being compatible with human perception and motor control so as to reduce the frustration that resulted from prior art transfer functions due to the difficulty in the prior art transfer functions of pointing to a desired target.

Specifically, in the present invention, a transfer function assuming a form corresponding to a parabolic-sigmoid is used. Such a transfer function includes a cut-off plateau in cursor velocity for high input forces so that the maximum cursor velocity is limited to a velocity which can be comfortably tracked by the human eye.

By limiting the cursor speed in the joystick device of the present disclosure to speeds which can be tracked by the eye, over-shooting of target points by users tends to be minimized. Although the maximum speed of the cursor is limited in the joystick device of the present disclosure relative to conventional joystick devices, the overall time required for a user to successfully position the cursor at a desired target point with the joystick device of the present disclosure is ordinarily less than the time required with a conventional joystick device. Moreover, the perceived level of frustration is generally reduced when the joystick device of the present disclosure is used compared to that of conventional joystick devices, since few, if any, additional displacements of the joystick of the present disclosure are generally required to recover from overshoot.

The general form of the parabolic-sigmoid transfer function has been varied so as to achieve a higher degree of correlation with human perception and motor control. These variations will be discussed below in conjunction with the figures which illustrate various embodiments of the inventive idea.

DETAILED DESCRIPTION OF THE PREFERRED EMBODIMENTS

Figure 1:
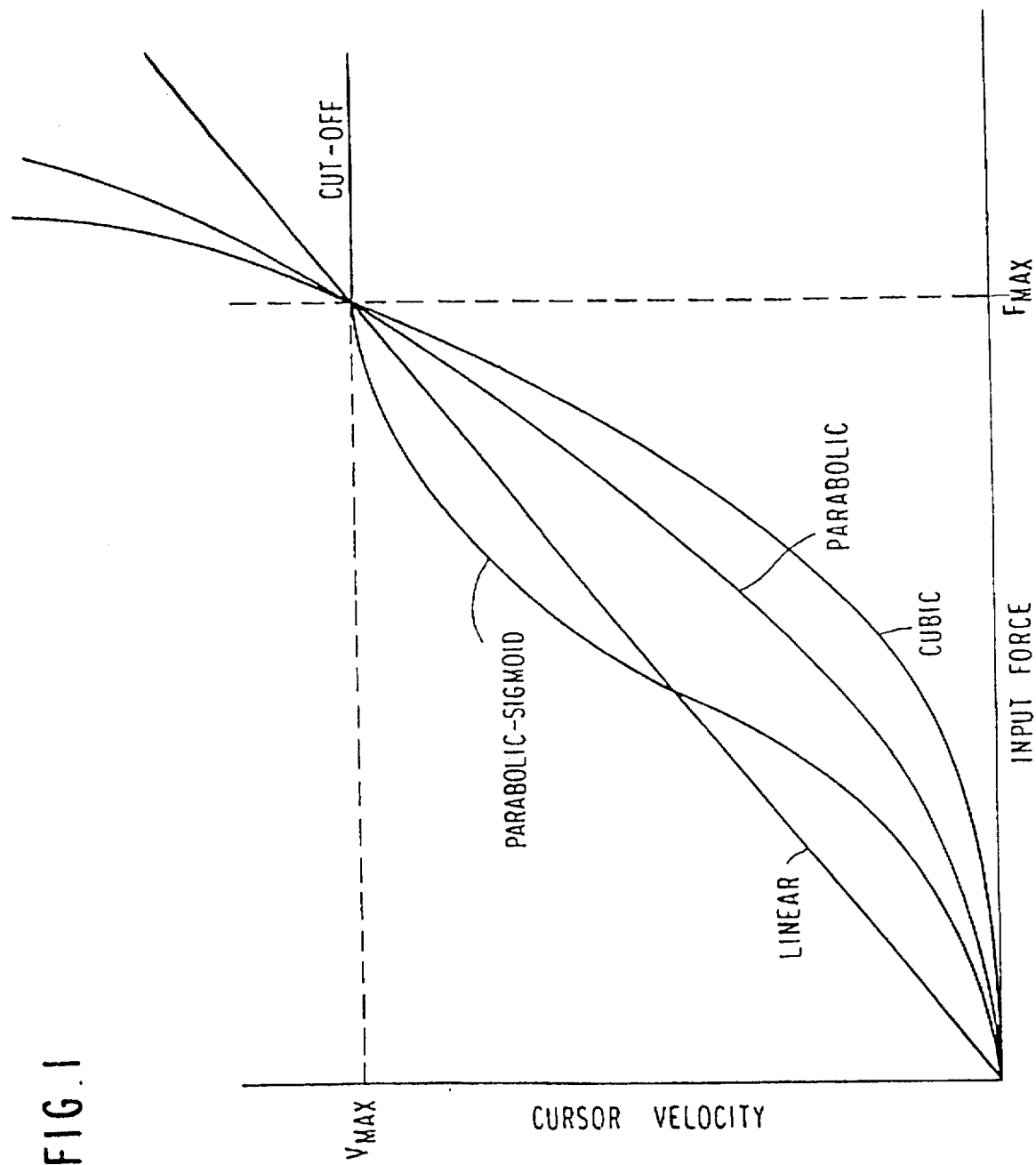
FIG. 1 shows a variety of different force-to-velocity mappings, including the parabolic-sigmoid mapping of the present invention.

FIG. 1 shows various possible force-velocity mappings (transfer functions) which may be used in relating the force applied to a pointing device to the resulting velocity of a cursor on a video screen. The linear, parabolic and cubic transfer functions are all well-known and all suffer from the drawbacks mentioned above, that is, that when a user applies the maximum input force $F_{MAX}$ to the pointing device, the cursor's velocity keeps increasing so that a user will overshoot a target on the screen.

Use of the parabolic-sigmoid transfer function, however, as discussed above, involves a cut-off in cursor velocity as the input force exceed $F_{MAX}$. Such a cut-off being low enough that the average human eye can track a moving cursor moving at velocity $V_{MAX}$. Thus, the problem of overshoot, with its accompanying user frustration, is greatly reduced by using the parabolic-sigmoid transfer function.

The parabolic-sigmoid transfer function is obtained by reflecting the initial part of a parabola in the point ½, ½ [$(v=2\times f^2, 0 \leq f \leq ½; v=2\times(½-(1-f)^2, ½ \leq f \leq 1; v=1, f>1)$]. The equation for a parabolic-sigmoid is thus in three pieces. First, it is a parabola up to a certain point. Second it is a reflected parabola. Third, a sharp cut-off occurs. Force f and velocity v have scale factors (coefficients), making the transfer function a 2-parameter family of functions.

Figure 2:
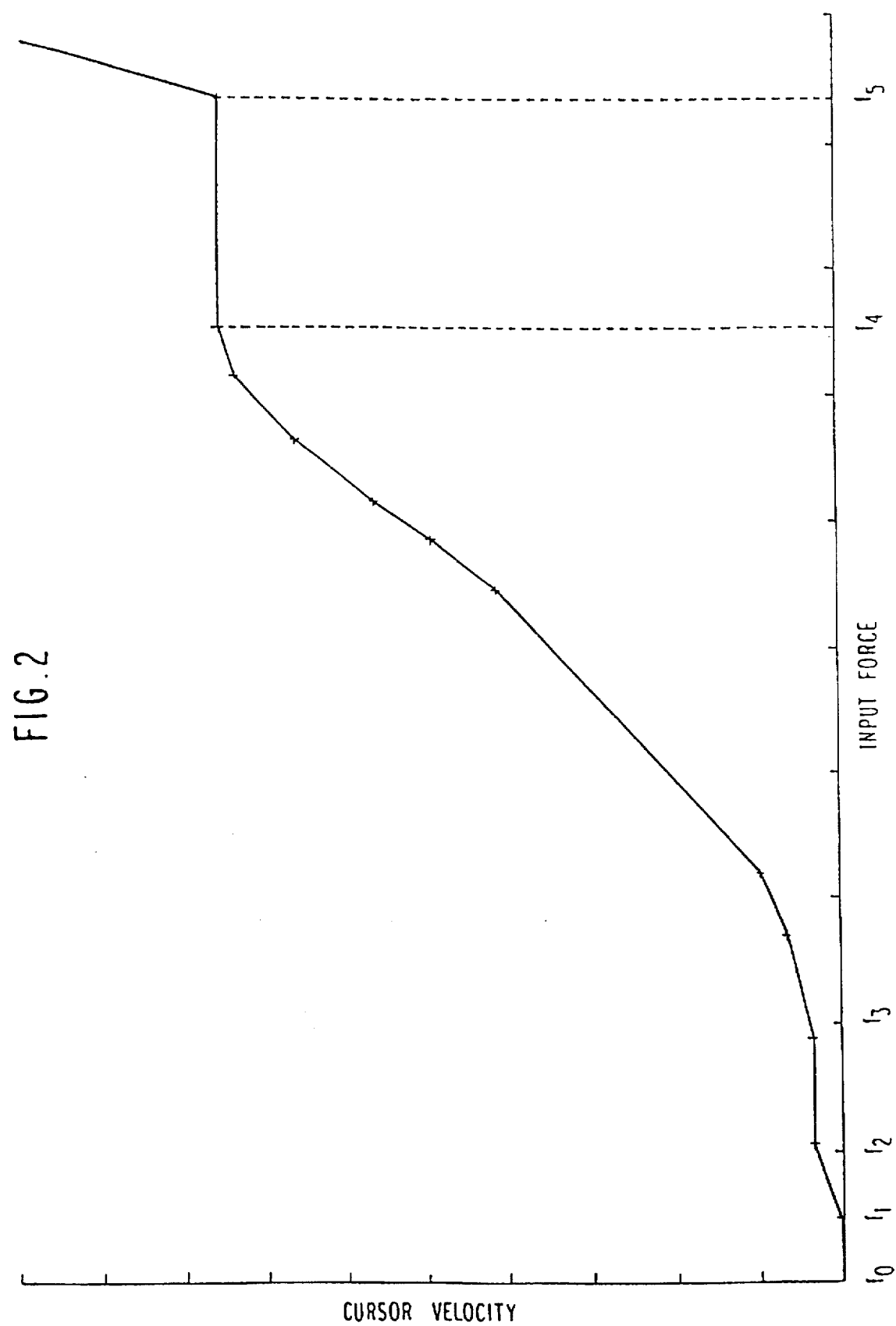
FIG. 2 shows a modified version of the general parabolic sigmoid function according to the present invention.

By experimenting with the functions in the above-mentioned family or S-shaped functions, the following modification of the general parabolic-sigmoid transfer function has been discovered as shown in FIG. 2. The ordinate of this graph is cursor velocity, the abscissa is force, in percent of the corresponding scale factors. The velocity scale factor (multiplier of v in the above formulas) is 1500 pixels/second, or on a screen, 66 cm/second. The force scale factor (multiplier of f) was fixed for these experiments at a comfortable value of 225 grams; all sensitivity adjustments were done with the velocity scale.

As shown in FIG. 2, when the minimum amount of force, that is, a force between $f_0$ and $f_1$ is applied to the pointing device, there is no increase in cursor velocity, which remains zero. Thus, the transfer function begins with a dead band region. The purpose of this dead band region is to allow the cursor to sit steady even though the user has fingers on the joystick. This dead band region takes into account that a human user may wish to hold on to the joystick without having the cursor move. Since it is practically impossible to hold on to the joystick and not move it even a little, a dead band region is provided for input forces between $f_0$ and $f_1$.

The next section of interest of the transfer function of FIG. 2 is the section corresponding to input forces between $f_2$ and $f_3$. In this region a low plateau is provided, such a low plateau being higher than the dead band region mentioned above. The purpose of this low plateau is to provide for predictable slow motion for moving the cursor short distances under smooth control. Thus, the low plateau allows for fine tuning the cursor position.

The next region, between $f_3$ and $f_4$, is the general parabolic-sigmoid function discussed above. This region provides for a smooth increase in speed when the input force is increased.

The next region, between $f_4$ and $f_5$, is a high plateau which, as discussed above, limits the cursor speed to a speed which can be tracked by the human eye. This region performs the advantageous function of greatly limiting the possibility that a user will overshoot his target, thus resulting in a considerable decrease in user frustration.

The final section of the transfer function of FIG. 2 corresponds to input forces greater than $f_5$. For this region of forces, the velocity shoots up at a fast rate. This fast rate allows users to quickly dash the cursor across the screen by applying a high force. Such a low accuracy movement is desirable in situations where a menu is provided at the top of the screen and the user wishes to quickly move the cursor from a present position on the screen up to the menu region.

A high degree of accuracy is not required for this type of application because there is no chance for a vertical overshoot because the target, i.e., the menu, is at the top of the screen.

Figure 3:
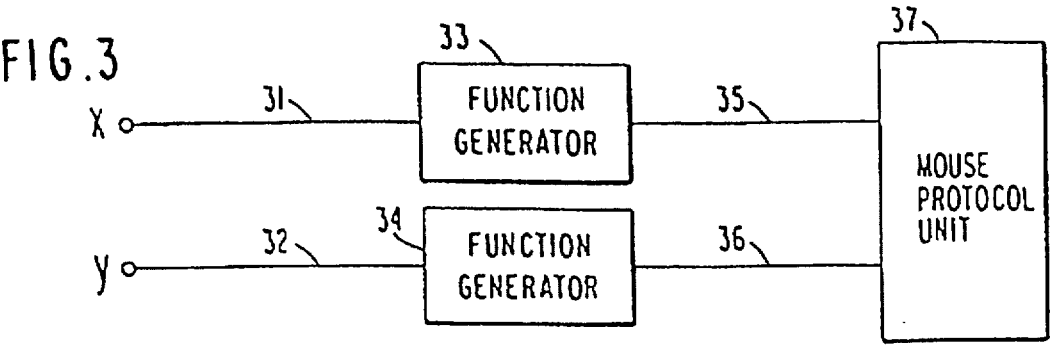
FIG. 3 shows an embodiment of the present invention using analog techniques.

An analog circuit implementation of the force-to-velocity transfer function of the present invention is shown in FIG. 3. A user applies force to a force joystick which has, as outputs, voltages proportional to the x and y components of the torque applied by the user's fingers. These voltages are applied on lines 31 and 32, respectively, and sent to respective function generators 33 and 34.

Function generators 33 and 34 take, as inputs, the voltages representing the force applied to the joystick and give as outputs cursor velocity signals on lines 35 and 36. The function generators 33 and 34 relate input force to output velocity according to the transfer function of FIG. 2 discussed above. The cursor velocity signals on lines 35 and 36 are sent to a mouse protocol unit 37 in order to make the cursor move with the velocity dictated by the cursor velocity signals. The mouse protocol unit could be replaced with any other suitable interface to communicate the velocity information to a computer, for example.

The mouse protocol unit 37 is well known in the art. Two different implementations of the mouse protocol unit 37 have been known. One involves quadrature signals (pulse trains) and is known as a parallel implementation. The parallel implementation was developed and manufactured by Hawley Laboratories of Berkeley, Calif. and the specification sheet for the Hawley mouse protocol (interface) is hereby incorporated by reference.

Another well-known implementation of the mouse protocol unit 37 is known as a serial implementation in which messages are transmitted between the mouse and the rest of the computer, such messages relating to how much the mouse has moved during a predetermined message interval. This serial implementation was developed by IBM and is described in *IBM Mouse Technical Reference*, First Edition (April, 1987) which is also incorporated herein by reference.

A digital circuit implementation of the force to velocity transfer function of the present invention will now be described with reference to FIG. 4. Voltages proportional to the x and y components of the torque applied by the user's fingers on a joystick are applied on lines 41 and 42, respectively. The voltages are next sent to analog-to-digital converters 43 and 44, respectively, and digital representations of the voltages are applied on lines 45 and 46, respectively, to look up tables 47A and 47B. The analog-to-digital converters sample the analog voltage signals at a rate which is fast with respect to human response, for example, 100 times per second.

The look up tables 47A and 47B store the transfer function of FIG. 2. The look up tables 47A and 47B take the digital representations of the force voltages on lines 45 and 46 as address signals and output on lines 48A and 48B cursor velocity signals representative of the cursor velocity dictated by the transfer function of FIG. 2 for a particular force input. The cursor velocity signals on lines 48A and 48B are next applied to mouse protocol unit 49 which is substantially the same as the corresponding unit 37 in FIG. 3.

Figure 4:
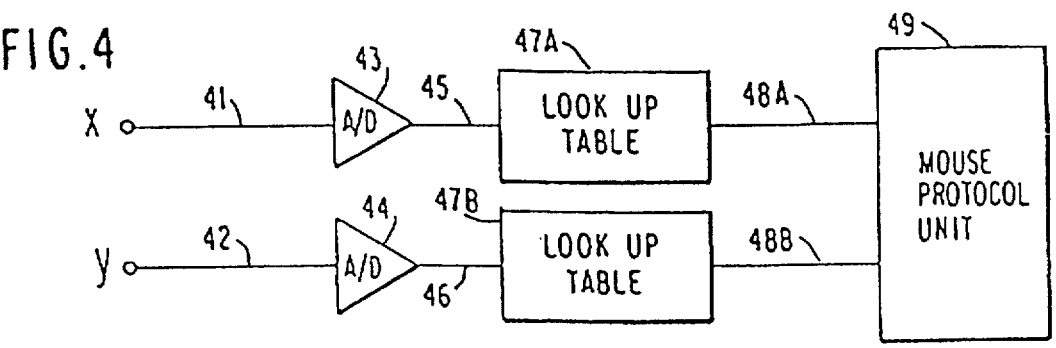
FIG. 4 shows a second embodiment of the present invention using digital techniques.
Figure 5:
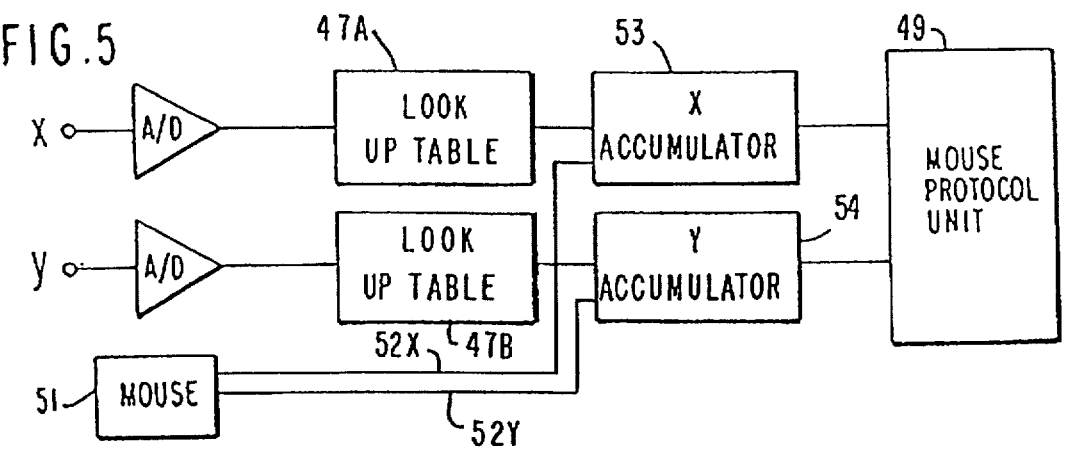
FIG. 5 shows a third embodiment of the present invention in which two different types of input devices may be used.

In FIG. 5, a modification of the embodiment of FIG. 3 is shown. In FIG. 5, provision is made to allow for the simultaneous use of a force joystick (as described above in conjunction with FIGS. 3 and 4) and a mouse 51. Unlabelled elements in FIG. 5 are the equivalents of their counterparts in FIG. 4.

Outputs of a mouse 51 on lines 52x and 52y are supplied to x and y accumulators 53 and 54, respectively. The x accumulator 53 receives as inputs the digital representations of the x component cursor velocity signals from the look up table 47A and the mouse signals from line 52. The x accumulator 53 accumulates the signals coming in from either of its inputs and provides a cumulative output to mouse protocol unit 49.

Likewise, a y accumulator 54 is provided for analogously providing a cumulative output to mouse protocol unit 49.

Figure 6:
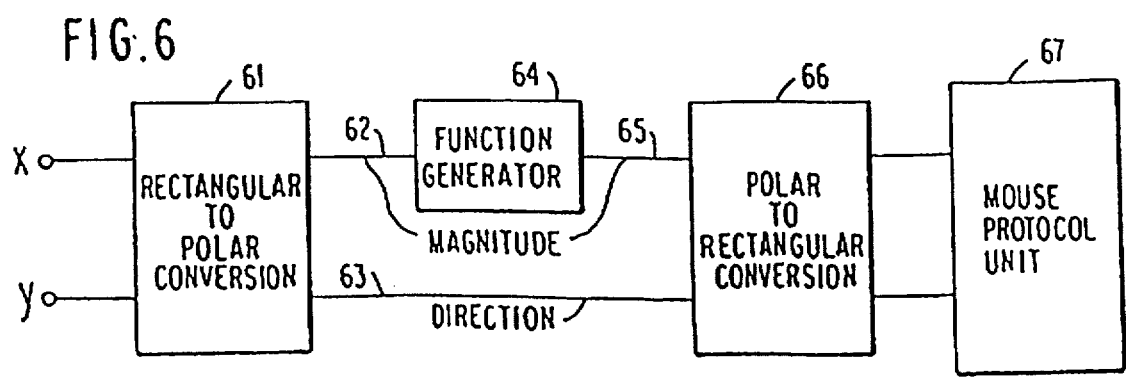
FIG. 6 shows a fourth embodiment of the present invention in which the direction of the input force is preserved.

A variation of the analog implementation of FIG. 3 will now be described in conjunction with FIG. 6. FIG. 6 shows a direction-preserving embodiment where the implementation of FIG. 3 is applied only to the speed (magnitude of velocity). It is also within the scope of the invention to apply this direction preserving embodiment to the digital representation of FIG. 4.

In FIG. 6 the x and y signals are obtained from a force joystick as explained above in conjunction with FIGS. 3 through 5. The signals are next sent to a rectangular to polar conversion circuit 61 which takes the rectangular coordinates, x and y, and transforms them, in a well-known fashion, into polar coordinates of magnitude and direction. The magnitude output 62 of circuit 61 is sent to function generator 64 which is identical to the function generators 33 and 34 of FIG. 3. That is, the function generator performs the transfer function shown in FIG. 2. Thus, only the magnitude of the input force is used in the force/cursor velocity transformation performed by function generator 64.

A cursor velocity magnitude signal is then output by the function generator 64 onto line 65 and applied as a magnitude input to a polar to rectangular coordinate conversion circuit 66. Meanwhile, the direction coordinate output of the rectangular to polar conversion circuit 61 is output on line 63 and sent directly as a direction coordinate input to polar to rectangular conversion circuit 66. The rectangular coordinates output of the polar to rectangular conversion circuit 66 are then supplied to a mouse protocol unit 67 which moves the cursor at a velocity determined by the input to the unit 67.

In this way, the direction of the input force is not modified by the transfer function of FIG. 2 and thus the direction of the input force has been preserved. This mode of operation, as showing FIG. 6, would be preferable for drawing applications.

With the embodiment shown in FIG. 4, that is, the embodiment where the force-velocity transfer function is embodied in software, for example, in a look up table, it is possible to store a plurality of different transfer functions in the look-up-table and to use different transfer functions for different user applications. For example, for a word processing application of a computer, one transfer function may be optimal, while for a drawing application, another transfer function may be optimal. When a user decides to use the computer for a certain application, an optimal transfer function for that particular application can be used to relate joystick force to cursor velocity.

Also, using the software implementation of FIG. 4, it is possible to provide for an adjustable transfer function relating force to cursor velocity. That is, by using writable memories, such as RAMs, as the look up tables in FIG. 4, it is possible to allow for the values stored in the memories to be alterable in such a way that the transfer function can change over time as a user becomes more adept (or less adept) at controlling the velocity of the cursor. The change can be made either directly by the user, or automatically, so as to match the skills and abilities of the individual user as he gains or loses facility in the use of the system.

The values in the memories could be changed, for example, by multiplying the values all by a multiplication factor so as to either compress or expand the curve, depending on whether the multiplication factor is less than or greater than unity, respectively. Also, the transfer function may be altered only within a certain range of values so that, for example, the low plateau of FIG. 2 may remain the same while only the high plateau section of the transfer function changes.

The automatically alterable transfer function discussed above could operate, for example, to check a user's performance level, in terms of the time it takes a user to accurately position the cursor, while using a certain transfer function, by comparing a user's performance with a predetermined performance which is determined to be satisfactory for a certain transfer function. If the user's present performance level is below the predetermined level then the transfer function could be automatically altered as discussed above.

The video screen of the present invention could be for a digital computer, an analog computer, a digital or analog video game system, an air traffic control system, or the like.

The scope of the present invention is not intended to be limited to the above-mentioned embodiments, but only by the appended claims.

What is claimed is:

1. A method of controlling the velocity of a cursor on a video screen based on the force applied on a user-controlled pointing device, said method comprising the following steps:

(a) maintaining the velocity of said cursor at zero when a first predetermined range of forces is applied to said pointing device;

(b) maintaining the velocity of said cursor at a first constant value when a second predetermined range of forces is applied to said pointing device, said second predetermined range of forces being greater in magnitude than said first predetermined range of forces;

(c) allowing the velocity of said cursor to vary with the applied input force according to a parabolic-sigmoid transfer function when a third predetermined range of forces is applied to said pointing device, said third predetermined range of forces being greater in magnitude than said second predetermined range of forces;

(d) maintaining the velocity of said cursor at a second constant value, said second constant value being greater than said first constant value, when a fourth predetermined range of forces is applied to said pointing device, said fourth predetermined range of forces being greater in magnitude than said third predetermined range of forces; and (e) allowing the velocity of said cursor to vary with the applied input force according to a substantially linear transfer function with a slope greater than unity when a fifth range of input forces is applied to said pointing device, said fifth range of input forces being greater is magnitude than said fourth predetermined range of forces.

2. A method of controlling the velocity of a cursor on a video screen based on the force applied on a user-controller pointing device, in which the velocity of said cursor is related to the force applied on said pointing device according to a parabolic-sigmoid function.

3. A method of controlling the velocity of a cursor on a video screen based on the force applied on a user-controlled pointing device, said pointing device responsive to various ranges of forces including a predetermined upper range of forces, in which the velocity of said cursor is related to the force applied on said pointing device according to a parabolic-sigmoid function, and in which the velocity of said cursor is governed to remain at a constant value when a force in said upper range of forces is applied to said pointing device.

4. A method according to any of claims 1, 2 or 3 in which said method allows a user to use a mouse to indicate desired cursor movement characteristics in addition to said pointing device.

5. A method according to any of claims 1, 2 or 3 in which said method allows for only the magnitude of the force applied on said pointing device to be related to the magnitude or the cursor velocity.

6. A method according to any of claims 1, 2 or 3 in which said method allows a user to choose a different transfer function to control the relationship between force and cursor velocity for a different application of said video screen.

7. A method according to any of claims 1, 2 or 3 in which said method allows a user to vary a transfer function which governs the relationship between force and cursor velocity based on a user's performance.

8. A method according to any of claims 1, 2 or 3 in which said method provides an automatic variation in a transfer function which governs a relationship between force and cursor velocity based on a user's performance.

9. A method of controlling the velocity of a cursor on a video screen based on forces applied on a user-controlled pointing device, in which the velocity of said cursor is related to forces applied to said pointing device, comprising the first step of:

maintaining the velocity of the cursor within a first relatively small range of velocities when forces within a first predetermined range of forces are applied to the pointing device;

increasing the velocity of the cursor within a second range of velocities when forces within a second predetermined range of forces, which is higher than the first range of forces, are applied to the pointing device; and limiting the velocity of the cursor to within a third relatively small range of velocities when forces within a third predetermined range of forces, which is higher than the second range of forces, are applied to the pointing device, said third range of velocities being higher than said first range of velocities, but low enough such that the cursor moving at a speed within said third range of velocities is trackable by the human eye, and wherein the rate of change in velocity within the third range of velocities is substantially smaller than the rate of change in velocity within the second range of velocities.

10. The method of controlling the velocity of a cursor on a video screen as in claim 9, further comprising the step of rapidly increasing the velocity of the cursor when a force falling in a fourth range of forces, which is higher than the third range of forces, is applied to said pointing device.

11. The method of claim 9, wherein at least a portion of said first relatively low velocity range is a constant velocity.

12. The method of claim 9, wherein at least a portion of said third relatively low velocity range is a constant velocity.

13. A method of controlling the velocity of a cursor on a video screen based on the force applied on a user-controlled pointing device, in which the velocity of said cursor is related to the force applied to said pointing device, comprising the step of:

controlling the velocity of said cursor according to a substantially S-shaped function, wherein within a short range at a bottom portion of said S-shaped function the velocity of the cursor is maintained at a first substantially constant speed, and within a short range at a top portion of the S-shaped function the velocity of said cursor is maintained at a second substantially constant speed which is higher than the first substantially constant speed.

14. The method of claim 13, wherein said S-shaped function is approximated by using segments of linear functions.

15. A computer system comprising:

a pointing device;

a cursor displayed on a video screen;

a controlling means for controlling velocity of said cursor depending on a force applied to the pointing device, said controlling means controls the velocity of said cursor according to a substantially S-shaped function, wherein within a short range at a bottom portion of said S-shaped function said controlling means maintains the velocity of the cursor at a first low speed, and within a short range at a top portion of the S-shaped function the controlling means maintains the velocity of said cursor at a second speed higher than the first low speed.

16. The computer system of claim 15, wherein said controlling means approximates the S-shaped function using segments of linear functions.

17. A method of controlling the velocity of a cursor on a video screen based on the force applied on a user-controlled pointing device, in which the velocity of said cursor is related to the force applied on said pointing device, comprising the steps of:

increasing the velocity of the cursor when a force falling in a predetermined first range of forces is applied to the pointing device; and reducing the rate of change of the velocity when a force falling in a predetermined second range of forces, which is higher than the said first range of forces, is applied to the pointing device, to thereby maintain the cursor moving at a speed trackable by the human eye.

18. The method of claim 17, further comprising the step of:

increasing the velocity of the cursor when a force falling in a third range of forces, which is higher than the second range of forces, is applied to said pointing device.

19. A computer system comprising:

a pointing device;

a cursor displayed on a video screen;

a controlling means for controlling velocity of said cursor depending on a force applied to the pointing device, said controlling means increasing the speed of said cursor when a force falling in a first range of forces is applied to the pointing device, and said controlling device reducing the rate of increase in speed of said cursor when a force falling in a second range of forces, which is higher than said first range of forces, is applied to said pointing device.

20. The computer system of claim 19, wherein said controlling means further increases the velocity of said cursor when a force falling in a third range of forces, which is higher than said second range of forces, is applied to said pointing device.

21. The method of claim 2, wherein said parabolic-sigmoid function is defined as $v=2\times f^2$, $0 \leq f \leq \frac{1}{2}$; $v=2\times(\frac{1}{2}-(1-f)^2)$, $\frac{1}{2} \leq f \leq 1$; $v=1$, $f>1$.

22. The method of claim 3, wherein said parabolic-sigmoid function is defined as $v=2\times f^2$, $0 \leq f \leq \frac{1}{2}$; $v=2\times(\frac{1}{2}-(1-f)^2)$, $\frac{1}{2} \leq f \leq 1$; $v=1$, $f>1$.

23. A method according to any of claims 1, 2, 3, 21, or 22, in which said parabolic-sigmoid function is approximated by segments of linear functions.

24. The method of controlling the velocity of a cursor on a video screen as in claim 9, wherein said step of increasing the velocity of the cursor includes increasing the velocity in a continuous manner.

25. The method of controlling the velocity of a cursor on a video screen as in claim 9, wherein said step of increasing the velocity of a cursor includes increasing the velocity in a step-wise manner.

26. The method of controlling the velocity of a cursor on a video screen as in claim 17, wherein said step of increasing the velocity of the cursor includes increasing the velocity in a continuous manner.

27. The method of controlling the velocity of a cursor on a video screen as in claim 17, wherein said step of increasing the velocity of a cursor includes increasing the velocity in a stepwise manner.

28. The computer system of claim 19 wherein said controlling means controls the velocity of said cursor in a continuous manner.

29. The computer system of claim 19 wherein said controlling means controls the velocity of said cursor in a step-wise manner.

* * * * *